Patented Aug. 25, 1931

1,820,816

UNITED STATES PATENT OFFICE

JAMES McINTOSH, OF NORRISTOWN, PENNSYLVANIA, ASSIGNOR, BY MESNE ASSIGNMENTS, TO CONTINENTAL-DIAMOND FIBRE COMPANY, OF NEWARK, DELAWARE, A CORPORATION OF DELAWARE

SYNTHETIC RESIN AND METHOD OF MAKING SAME

No Drawing. Application filed August 12, 1920. Serial No. 403,125.

My invention relates to that class of condensation products utilizing phenol or one of its homologues as one of its ingredients, and one object of said invention is to provide a new condensation product of the above class which shall employ in its formation that class of chemical compounds known as carbohydrates, and more particularly water-soluble carbohydrates.

It is also desired to provide a synthetic resin which shall be inexpensive and easy to make, whose nature shall be such as to fit it for use as a shellac substitute, as a waterproofing agent for an impregnating sheet, tube and rod material made of paper, woven or felted fabric, parchmentized fibre and for the many other uses requiring a hard relatively infusible, insoluble and structurally strong, light, tough substance.

Another object of the invention is to provide a synthetic resin of the above class which shall be available for use as a non-conductor of high dielectric value which shall be water and oil proof and which may be prepared in soluble or insoluble form at will, being, when in soluble form, capable of further treatment whereby it may be changed at will into its insoluble and infusible form.

I also desire to provide a condensation product which in its initial stage or form may be utilized in connection with suitable powdered material from which articles may be subsequently molded under heat and pressure whereby said product is transferred to its final solid and infusible form.

It is further desired to provide a novel method of making the above noted condensation product; the invention especially contemplating the utilization of hexoses, pentoses, tetroses, and trioses in the formation of phenolic condensation products and being designed to provide a relatively simple, inexpensive and easily operated process whereby products of the above class may be made.

In carrying out my invention I may employ the ingredients in the proportion of 1 molecule of a phenolic body to one molecule of a carbohydrate such as dextrose, but in a typical case I prefer to dissolve one hundred grams of phenol and one hundred grams of dextrose in a suitable solvent such as one hundred grams water, together with a suitable catalytic agent, such as from ten to twenty drops of sulphuric acid in the case specified.

The above mixture is then boiled from five to six hours under a reflux condenser, at the end of which time the liquid on standing, separates into two layers. The top layer is then drawn off and after being washed with water to remove all traces of the catalytic agent, consists of a dark, mucilaginous or semi-solid material constituting an initial condensation product. It is then soluble in alcohol, acetone, benzol, etc.

When subjected to further condensation by being heated to a temperature of about 125° C. for from ten to twelve hours it will change to its solid form in which it is infusible at all temperatures and insoluble in the ordinary organic solvents such as those above noted.

It may be used in the manufacture of molded articles, etc. as well as employed for any of the purposes for which other phenolic condensation products are now utilized, being especially valuable as a shellac substitute. When in the initial or semi-solid stage it may be employed as a base in the manufacture of varnish and may be used for the impregnation of vulcanized fibre or fabrics in sheet, tube, block or rod form, after which upon the application of suitable heat such as that resulting from 125 lbs. steam pressure and a pressure of say one thousand pounds per square inch for from one to 5 hours or more, depending upon the dimensions and form, it may be caused to change to its final or solid form.

In making a laminated structure such as block or sheet, the above condensation product in its liquid or semi-solid initial stage is dissolved in from fifty to sixty parts of an organic solvent such as alcohol or acetone and is caused to uniformly permeate the sheet or other fibrous or porous body either by directly soaking the latter in said liquid or by any other known method. The impregnated sheets or other structures are dried in a vacuum or an oven at 200° F. for six to ten hours to remove the solvent and the dried sheets subjected to relatively high pressure such as one thousand pounds to the square inch and to a temperature such as that of steam at one hundred and twenty-five pounds pressure for a period depending upon the thickness and dimensions of said material. Tubes or rods may be made from the above described impregnated sheet material by winding the latter on a mandrel of suitable dimensions and thereafter subjecting it to heat and pressure such as above indicated.

In any case the resulting product is unaffected by moisture and by the ordinary organic solvents, it has a high mechanical strength and is especially adapted for mechanical and electrical purposes, being particularly useful in the manufacture of gears, electrical insulators, phonograph records, etc.

Without departing from my invention I may vary the proportions of the carbohydrate and of the phenolic body employed therewith and I may also vary the temperatures, pressures and time of treatment, the essential feature of the invention residing in the production of a condensation product constituting a synthetic gum or resin by utilization of a phenolic body and a carbohydrate. In place of phenol I may employ any of its homologues such as o-m-p-cresol or any compound containing a hydroxyl radical joined to a benzene ring, substituted or not, and in addition to dextrose, may employ other carbohydrates such as starch, pentoses, tetroses, trioses. as well as others. The use of starch is described and claimed in Patent No. 1,753,030, of April 1, 1930, which was filed as a division of the present application.

While the condensation product in its initial stage is a liquid or semi-liquid soluble in acetone, alcohol, benzol, etc., in its final form it is infusible and insoluble in the above noted and other ordinary organic solvents, being a hard, tough, resinous substance, breaking with a lustrous fracture and of a dense, homogeneous structure.

If it be desired to accelerate the reaction above described, suitable proportions of hardening agents may be added prior to the subjection of the initial condensation product to heat and pressure, and as typical of these I may use hexamethylenetetramine, benzidine-acetone, sodium-acetone-bisulphite. etc. As typical of catalytic agents which may be employed in place of sulphuric acid, I may use bromine, pyridine, sulphur monochloride, aniline hydrochlorine, etc.

Certain catalysts, I find, for certain uses, cause deleterious effects on the materials used to form the objects made from the resin and therefore, the removal of the catalyst may be desirable. The catalyst may be removed by simply washing out with water or any other solvent of the catalyst in which the resin is insoluble, this removal by a purely physical method, is best done after the first fusible and soluble condensation product is formed, as heat alone without catalytic assistance will cause the condensation to become total and give a hard, infusible, insoluble product.

If the introduction of water or other solvent as mentioned above is not desirable, the catalyst may be removed by chemical means i. e. introducing some substance, inert in itself towards the materials which the catalyst destroys but reactive with the catalyst, forming a non-reactive or inert substance which in small quantity does not affect the desirable properties of the condensation product. The chemical removal of the catalyst takes place best after the first fusible and soluble product is formed, as heat alone can carry the condensation to the final stage. For instance if sulphuric acid is to be removed I add powdered barium carbonate in excess. Such barium carbonate is inert and barium sulphate formed may act as a filler.

If bromine is to be removed. I add an alcoholic solution of ammonia, and the ammonium bromide which is chiefly formed, is inert.

When in its initial stage the condensation product may be dissolved in alcohol. acetone, benzene, etc. and thereafter mixed with wood flour, asbestos, or other organic or inorganic material, after which the solvent may be removed by heat. The resulting mass may then be ground or otherwise reduced to a powder which may be readily molded to any desired form by subjecting it while in the mold to a pressure of approximately one thousand pounds to the square inch at a temperature equivalent to that of steam at one hundred and twenty-five pounds pressure and for a period of time depending upon the dimensions and form of the object being molded, the pressure and heat being continued in any case for a time sufficient to cause the condensation product to assume its final infusible and solid form.

I claim:—

1. The method of making a synthetic resin, which consists in mixing dextrose and phenol, heating said mixture to form an initial condensation product, and further heating the initial condensation product in the presence of hexamethylenetetramine to cause it to assume a hard, infusible form.

2. The method of making a synthetic resin, which consists in mixing phenol and dextrose, heating said mixture, arresting the reaction when there has been formed an initial condensation product, and further heating said initial condensation product with hexamethylenetetramine to further condense and solidify said product.

3. The process of producing a product adapted for use as artificial resinous material which comprises reacting a sugar with a monohydroxy phenol whereby substantially water-insoluble material is formed and heating the latter whereby it is hardened.

4. The process of producing reactive resinous material which comprises reacting a water soluble carbohydrate with a phenol whereby reactive resinous material is formed.

5. Product, adapted for use as resinous material, comprising the heated substantially water insoluble reaction products of a water-soluble carbohydrate and a phenol.

6. The process of making a synthetic resin which comprises causing a water-soluble carbohydrate and a phenol to react to produce an initial condensation product; and heating the same until there is produced a hard, infusible, insoluble resin.

7. The process of producing a synthetic resin which comprises heating together a phenol and a water-soluble carbohydrate in the presence of an acid catalyst until there is produced an initial condensation product; and further heating the same until there results a hard, infusible, insoluble resin.

8. The process of producing a synthetic resin which comprises heating together a phenol and a sugar in the presence of a catalyst until there is produced an initial condensation product; and further heating the same until there results a hard, infusible, insoluble resin.

9. As a new composition of matter, a hard, infusible, insoluble synthetic resin comprising the final reaction product of a phenol and a water-soluble carbohydrate.

10. As a new composition of matter, a hard, infusible, insoluble synthetic resin comprising the final reaction product of a phenol and a sugar.

11. The process of producing a synthetic resin which comprises heating together a phenol, a water-soluble carbohydrate and water in the presence of a catalyst until there is produced an initial condensation product; separating said product; and further heating the same until there results a hard, infusible, insoluble resin.

12. The process of producing a synthetic resin which comprises heating together a phenol, a sugar and water in the presence of a catalyst until there is produced an initial condensation product; separating said product; and further heating the same until there results a hard, infusible, insoluble resin.

13. The process of making a synthetic resin which comprises heating together a water-soluble carbohydrate, a phenol and a catalyst until there is formed an initial condensation product; adding a hardening agent to said product; and heating the mixture to cause the condensation product to assume its insoluble, infusible form.

14. As a new composition of matter, a hard, infusible, insoluble synthetic resin comprising the final reaction product of a phenol, a water-soluble carbohydrate and a hardening agent.

15. As a new composition of matter, a hard, infusible, insoluble synthetic resin comprising the final product of the reaction of the initial condensation product of a phenol and a water-soluble carbohydrate, with a hardening agent.

16. The process of making a synthetic resin which comprises causing a phenol and a water-soluble carbohydrate to react to form an initial condensation product; adding a hardening agent to said product, and heating the mixture to cause the condensation product to assume its insoluble, infusible form.

17. The process which consists in causing a water-soluble carbohydrate and a phenol to react to form an initial condensation product, and adding a hardening agent to this initial product to form a potentially reactive product which is capable of being converted into a hard, infusible, insoluble resin by heat.

18. A potentially reactive product resulting from the addition of a hardening agent to the initial condensation product obtained by reacting a water-soluble carbohydrate and a phenol.

JAMES McINTOSH.